(12) United States Patent
Atohira

(10) Patent No.: US 9,418,394 B2
(45) Date of Patent: Aug. 16, 2016

(54) OPERATION SIMULATION SYSTEM OF ROBOT SYSTEM

(71) Applicant: FANUC CORPORATION, Minamitsuru-gun, Yamanashi (JP)

(72) Inventor: Hiroyuki Atohira, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 3 days.

(21) Appl. No.: 13/790,614

(22) Filed: Mar. 8, 2013

(65) Prior Publication Data

US 2013/0311154 A1 Nov. 21, 2013

(30) Foreign Application Priority Data

May 18, 2012 (JP) .................... 2012-114839

(51) Int. Cl.
*G06G 7/48* (2006.01)
*G06T 1/00* (2006.01)

(52) U.S. Cl.
CPC ........................................ *G06T 1/00* (2013.01)

(58) Field of Classification Search
None
See application file for complete search history.

(56) References Cited

U.S. PATENT DOCUMENTS

| | | | |
|---|---|---|---|
| 2002/0147528 A1* | 10/2002 | Watanabe et al. | 700/245 |
| 2004/0189631 A1 | 9/2004 | Kazi et al. | |
| 2005/0224479 A1* | 10/2005 | Watanabe et al. | 219/125.1 |
| 2006/0184275 A1 | 8/2006 | Hosokawa et al. | |
| 2007/0078564 A1 | 4/2007 | Hoshino et al. | |
| 2007/0213874 A1* | 9/2007 | Oumi et al. | 700/245 |
| 2007/0242073 A1 | 10/2007 | Nagatsuka et al. | |
| 2007/0282485 A1* | 12/2007 | Nagatsuka et al. | 700/245 |
| 2009/0309531 A1* | 12/2009 | Hamahata | 318/565 |
| 2010/0161118 A1* | 6/2010 | Kwak et al. | 700/245 |
| 2013/0044115 A1 | 2/2013 | Oyama et al. | |

FOREIGN PATENT DOCUMENTS

| | | |
|---|---|---|
| CN | 101058183 A | 10/2007 |
| DE | 69735269 T2 | 7/2006 |
| EP | 1310843 A2 | 5/2003 |

(Continued)

OTHER PUBLICATIONS

Taskahashi Minoru, Robot System, Oct. 3, 2011, Denso Wave Inc., pp. 1-16.*

(Continued)

*Primary Examiner* — Omar Fernandez Rivas
*Assistant Examiner* — Bernard E Cothran
(74) *Attorney, Agent, or Firm* — Hauptman Ham, LLP

(57) ABSTRACT

An operation simulation system of a robot system for simulating operation of a robot system having a robot on a computer, including a setting unit setting a movement point moving together with a moving member, linked with the moving member which is included in the robot system and moves in accordance with a predetermined program; a data acquisition unit acquiring time series position data of the movement point when operating the robot system in accordance with the program on the computer; an image generation unit generating an image of the robot system operating in accordance with the program on the computer and generating an image of a movement path of the movement point based on the time series position data acquired by the data acquisition unit; and a display unit displaying the robot system image and the movement path image generated by the image generation unit.

14 Claims, 15 Drawing Sheets

(56) References Cited

FOREIGN PATENT DOCUMENTS

| | | |
|---|---|---|
| JP | 06126453 A | 5/1994 |
| JP | 06126483 A | 5/1994 |
| JP | 7078017 A | 3/1995 |
| JP | 07214317 A | 8/1995 |
| JP | 10128684 A | 5/1998 |
| JP | 11134017 A | 5/1999 |
| JP | 2000-343466 A | 12/2000 |
| JP | 2004-82313 A | 3/2004 |
| JP | 2004243516 A | 9/2004 |
| JP | 2007242054 A | 9/2007 |
| JP | 2009-211369 A | 9/2009 |
| JP | 2009211369 A | 9/2009 |
| JP | 2009274148 A | 11/2009 |
| JP | 2011045937 A | 3/2011 |
| JP | 2011161549 A | 8/2011 |
| JP | 2011526208 A | 10/2011 |
| WO | 2011080882 A1 | 7/2011 |
| WO | 2011114777 A1 | 9/2011 |

OTHER PUBLICATIONS

Corresponding Japanese Application No. 2012-114839 Office Action dated Jun. 4, 2013.
Office Action mailed Sep. 10, 2013 corresponds to Japanese patent application No. 2012-114839.
Office Action dated Oct. 10, 2014, corresponding to German patent application No. 102013008062.2.

\* cited by examiner

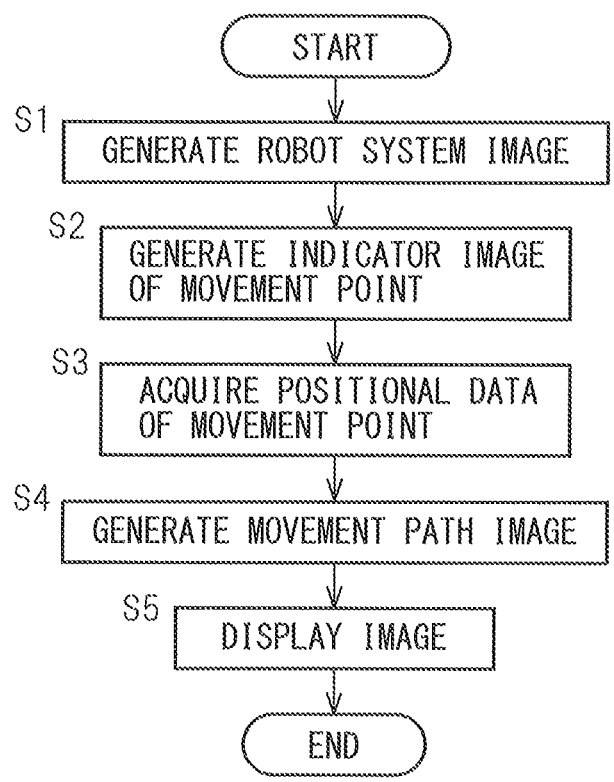

OPERATION SIMULATION SYSTEM OF ROBOT SYSTEM

RELATED APPLICATIONS

The present application is based on, and claims priority from, Japanese Application Number 2012-114839, filed May 18, 2012, the disclosure of which is hereby incorporated by reference herein in its entirety.

BACKGROUND OF THE INVENTION

1. Field of the Invention

The present invention relates to an operation simulation system of a robot system which simulates on a computer the operation of a robot system having a robot.

2. Description of the Related Art

In the past, a system designed to simulate the operation of a robot before actually operating the robot has been known. As such a type of system, Japanese Unexamined Patent Publication No. 2009-211369A (JP2009-211369A) describes a system which operates a robot on a computer based on teaching data, and displays the operation of the robot at that time on a display system by using a 3D model which represents the robot shape.

However, like in the system described in JP2009-211369A, by just displaying the operation of the robot as the result of simulation, it is possible for a user to easily obtain a grasp of how a specific portion operates.

SUMMARY OF THE INVENTION

One aspect of the present invention is an operation simulation system of a robot system for simulating the operation of a robot system having a robot on a computer, includes a setting unit setting a movement point moving together with a moving member, linked with the moving member which is included in the robot system and moves in accordance with a predetermined program; a data acquisition unit acquiring time series position data of the movement point when operating the robot system in accordance with the program on the computer; an image generation unit generating a robot system image which is an image of the robot system operating in accordance with the program on the computer and generating a movement path image which is an image of a movement path of the movement point based on the time series position data acquired by the data acquisition unit; and a display unit displaying the robot system image and the movement path image generated by the image generation unit.

BRIEF DESCRIPTION OF THE DRAWINGS

The objects, features, and advantages of the present invention will become clearer from the following description of the embodiments given in relation to the attached drawings, in which:

FIG. 4 is a flow chart which shows an example of processing which is executed at a control unit of FIG. 2.

DETAILED DESCRIPTION

First Embodiment

Figure 1:
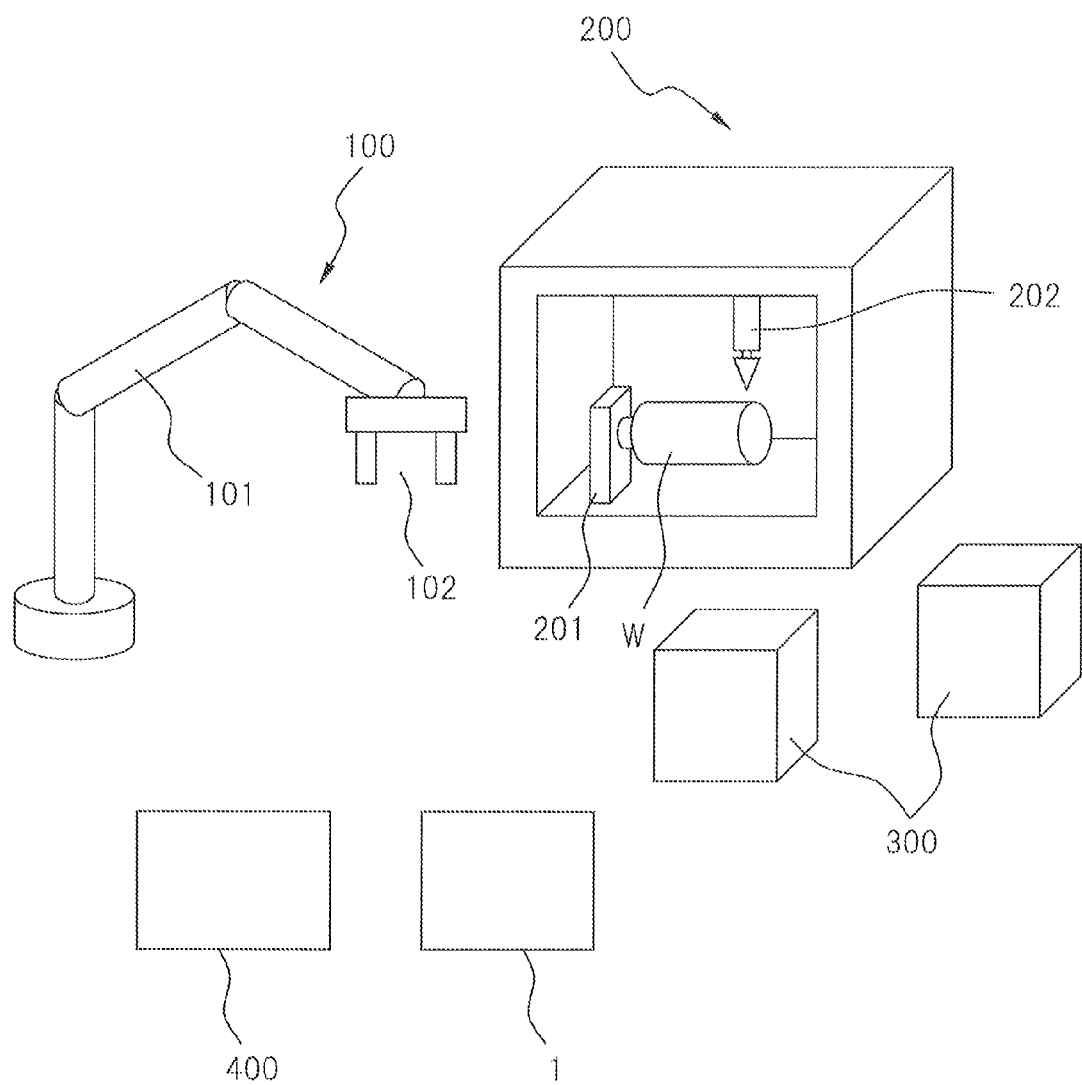
FIG. 1 is a view which shows the general configuration of a robot system to which an operation simulation system according to a first embodiment of the present invention is applied.

Hereinafter, referring to FIG. 1 to FIG. 8B, a first embodiment of the present invention will be explained. FIG. 1 is a view which shows the general configuration of a robot system to which an operation simulation system according to a first embodiment of the present invention is applied. As shown in FIG. 1, the robot system has a robot 100, a machine tool 200 which works a workpiece W, a peripheral device 300, a control device 400, and an operation simulation system 1 which simulates operation of the robot system and is configured as a robot system for working a workpiece.

The robot 100 is for example a multiarticulated robot. It has a pivoting arm 101 and a hand 102 which is provided at the front end of the arm 101 and grips a workpiece W. The machine tool 200 has a workpiece support 201 which supports a workpiece W handled by the robot 100 and a tool 202 which works the workpiece W. The peripheral devices 300 are, for example, conveyors, pallets, or other conveyance apparatuses which convey a workpiece W toward the robot 100. The robot 100, machine tool 200, and peripheral devices 300 respectively have actuators (servo motors etc.) and operate by driving of the actuators.

The memory of the control device 400 and the memory of the operation simulation system 1 store in advance an operating program, shape data of the parts which constitute the robot system, and shape data etc. of the workpiece. The control device 400 outputs control signals to the actuators of the robot 100, machine tool 200, and peripheral devices 300 in accordance with the operating program stored in advance so as to control the operation of the robot system. The operation simulation system 1 can prepare a 3D model of the robot system which changes with each instant along with advance of the operating program, based on the operating program and shape data of the parts stored in advance.

Figure 2:
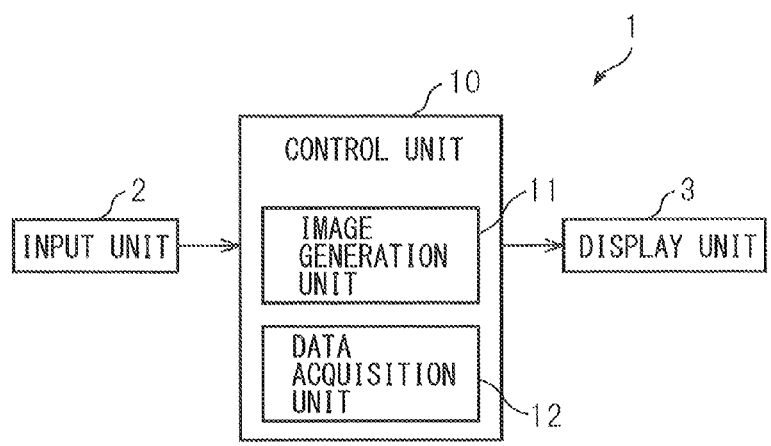
FIG. 2 is a block diagram which shows the general configuration of an operation simulation system according to the first embodiment of the present invention.

FIG. 2 is a block diagram which shows the general configuration of the operation simulation system 1 according to the first embodiment. As shown in FIG. 2, the operation simulation system 1 has an input unit 2 by which the user inputs various conditions relating to the simulation, a control unit 10 which run an operation simulation of the robot system based on the signals from the input unit 2, and a display unit 3 which displays the results of simulation by the control unit 10. The input unit 2 is, for example, comprised of a keyboard, mouse, etc., while the display unit 3 is, for example, comprised of a liquid crystal display etc. The input unit 2 and the display unit 3 can for example be comprised by a touch panel.

The control unit 10 is a computer comprised including a processing system which has a CPU, ROM, RAM, and other peripheral circuits etc. (for example, a personal computer). In the state where the control device 400 is not operated (off-line), it is possible to run an operation simulation of the robot system. The control unit 10, as a functional configuration, has an image generation unit 11 which generates various images displayed on the display unit 3 and a data acquisition unit 12 which acquires position data of movement points P when operating the robot system in accordance with an operation program on a computer. The movement points P are points which a user sets for obtaining a grasp of the movement path of a specific portion of the robot system, that is, points noted by a user (noted points). The movement points P are, for example, set to any positions linked with specific moving members 5 which move during operation of the robot system due to operation of the input unit 2 (see FIG. 3A and FIG. 3B).

Figure 3A:
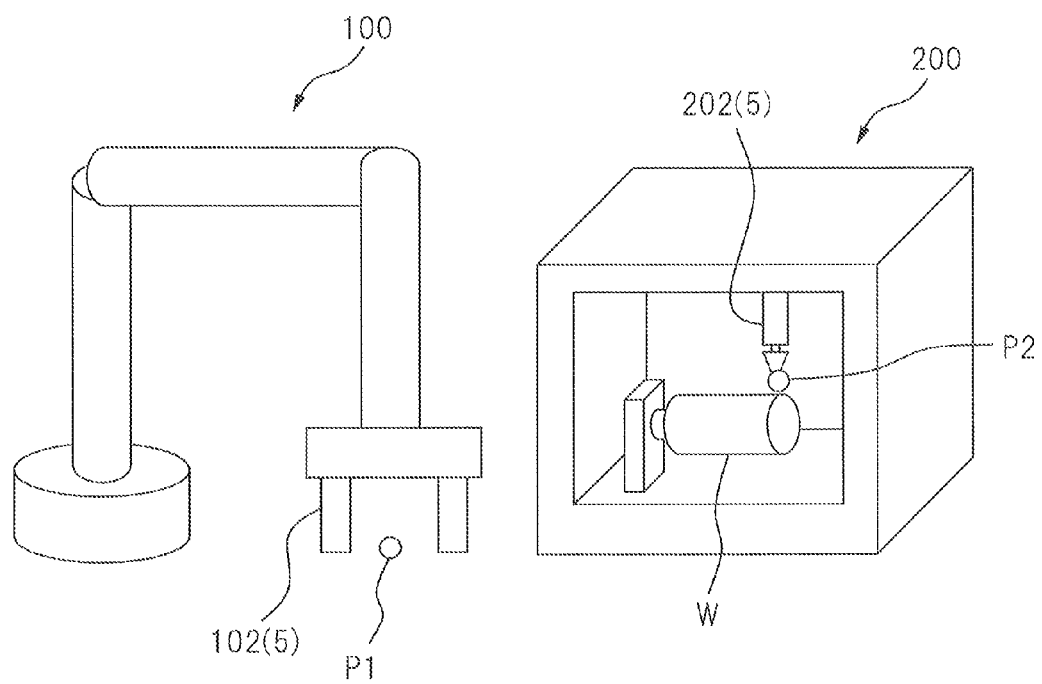
FIG. 3A is a view which shows an example of movement points which are set at the operation simulation system of FIG. 2.

FIG. 3A is a view which shows an example of the movement points P. In FIG. 3A, a movement point P1 is set at a center position of a pair of grippers at the front end of the hand 102, while a movement point P2 is set at a front end position of the tool 202. That is, the specific moving members 5 of the FIG. 3A are the hand 102 and the tool 202, while the movement points P1, P2 are set linked with the hand 102 and tool 202. The movement point P1 can be set using the positional coordinates of the hand 102, while the movement point P2 can be set using the positional coordinates of the tool 202.

Figure 3B:
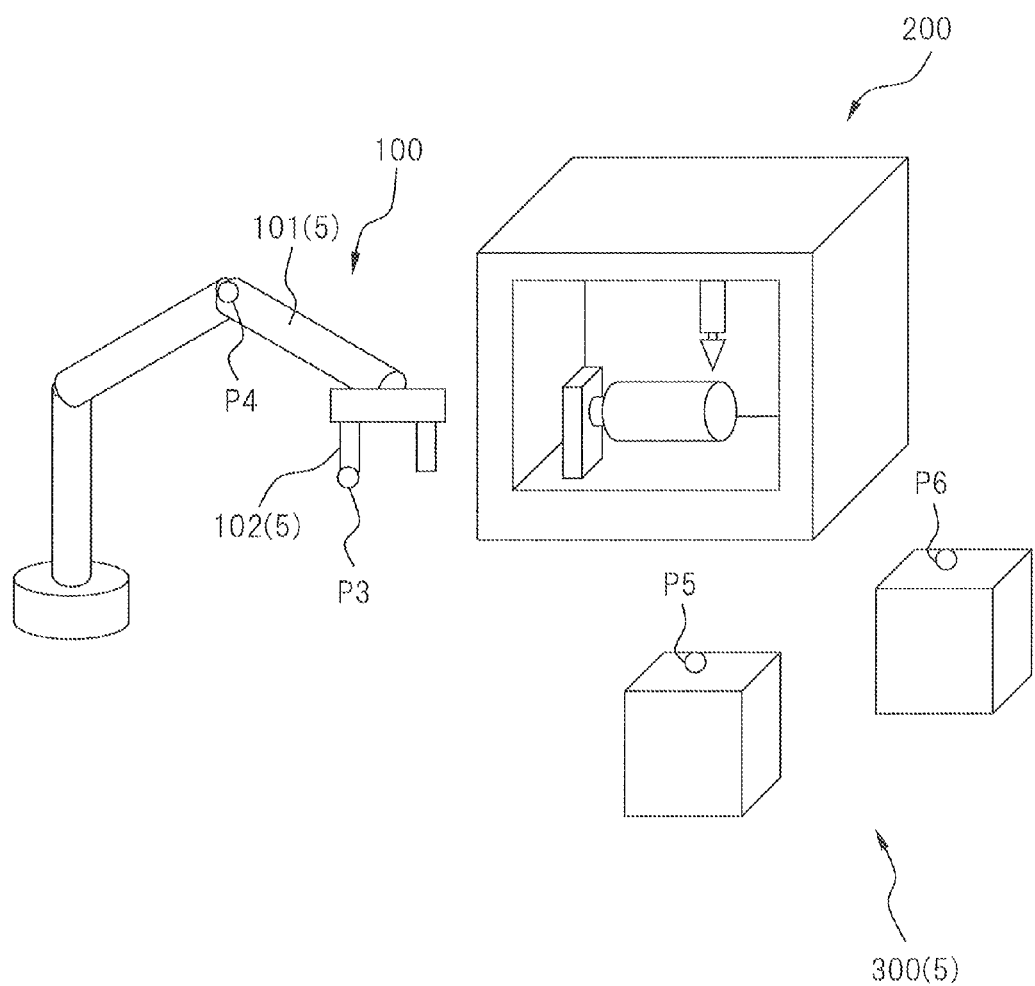
FIG. 3B is a view which shows another example of movement points which are set at the operation simulation system of FIG. 2.

FIG. 3B is a view which shows another example of the movement points P. In FIG. 3B, a movement point P3 is set at a front end position of one of the grippers of the hand 102, a movement point P4 is set at a rotary shaft of the arm 101, and movement points P5, P6 are set at center positions on the top surfaces of the peripheral devices 300. That is, the specific moving members 5 of FIG. 3B are the hand 102, arm 101, and the peripheral devices 300, while the movement points P3 to P6 are set linked with the hand 102, arm 101, and peripheral devices 300. The movement points P3 and P4 can respectively be set using the positional coordinates of the hand 102 and the arm 101, while the movement points P5 and P6 can respectively be set using the positional coordinates of the peripheral devices 300. The above movement points P1 to P6 move together with the specific moving members 5 while maintaining constant the positional relationships with the specific moving members 5 which correspond to the movement points P1 to P6.

FIG. 4 is a flow chart which shows an example of the processing executed by the control unit 10. The processing shown in the flow chart is started after setting the movement points P by operation of the input unit 2 in advance, for example, when a simulation start instruction is input by operation of the input unit 2, and is repeated by a predetermined period up to when the simulation ends. At step S1, by the processing at the image generation unit 11, the operation program of the robot system, the shape data of the parts forming the robot system, and the shape data of the workpiece W stored in the memory in advance are read. Further, the positional coordinates of the parts along with the advance of the operation program are computed based on the shape data of the parts and an image of a 3D model of the robot system (robot system image) which changes with each instant along with the advance of the operation program is generated. The processing of step S1 is repeatedly executed at a predetermined period while the operation program advances, so that the robot system image is constantly updated along with the advance of the operation program. The robot system image includes a workpiece image which shows the 3D shape of the workpiece W.

At step S2, by the processing at the image generation unit 11, an image which shows the movement points P is generated synchronously with the generation of the robot system image. In the present embodiment, the movement points P are expressed by indicators of a predetermined shape (see FIG. 5), while at step S2, indicator images are generated corresponding to the positions of the movement points P. The positions of the indicator images are updated every time the processing of step S2 is repeatedly executed at a predetermined period.

At step S3, by the processing at the data acquisition unit 12, position data of the movement points P which moves in accordance with advance of the operation program is acquired and the acquired position data is stored in the memory. By repeated execution of the processing of step S3 at a predetermined period, position data of a plurality of movement points P are stored in the memory as time series position data.

At step S4, by the processing at the image generation unit 11, the image of the movement path of the movement points P (movement path image) is generated, based on the time series position data which is stored in the memory. This movement path image is generated by successively connecting the plurality of movement points P on a line along a time series. Each time the processing of step S4 is repeatedly executed at a predetermined period, the movement path image is updated. It is also possible to connect a plurality of movement points P by a smooth curve to generate the movement path image and possible to determine an approximation curve of a plurality of movement points P and use this as the movement path to generate the movement path image.

At step S5, the robot system image, indicator images, and movement path image generated at the image generation unit 11 are displayed on the display unit 3. Due to this, a single processing is ended.

Figure 5:
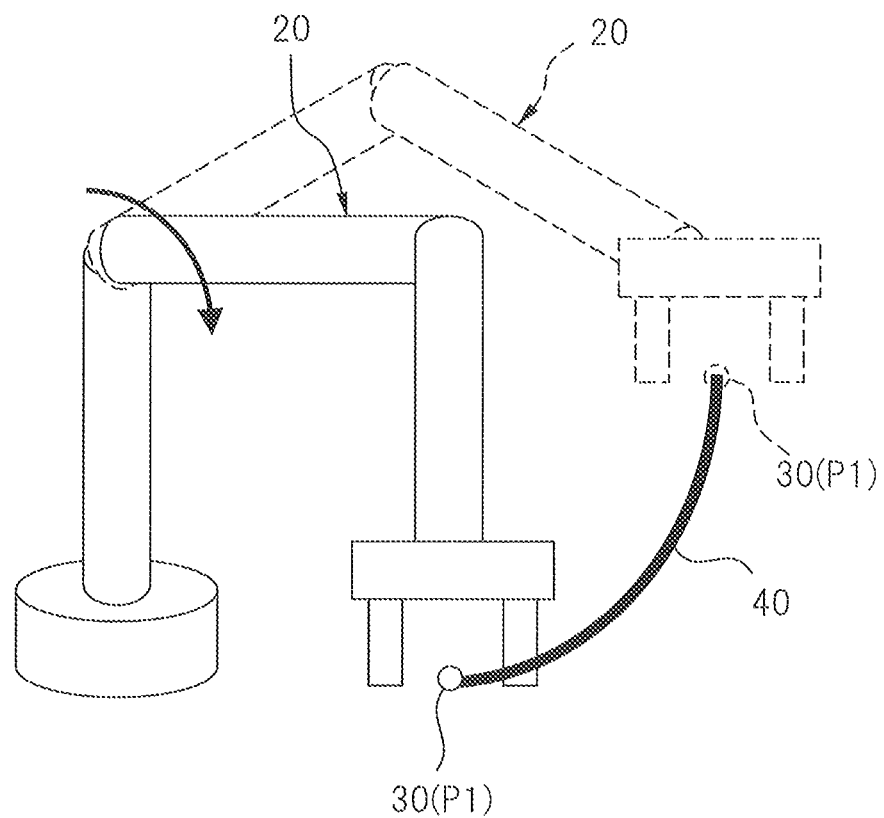
FIG. 5 is a view which shows an example of a display image which is displayed on a display unit of FIG. 2.

FIG. 5 is a view which shows an example of a display image displayed on the display unit 3. In the figure, as the robot system image 20, only the image of the robot 100 is shown. The movement point P1 (see FIG. 3A) is set at the front end of the grippers of the hand 102 of the robot 100, so the hand 102 is a specific moving member 5. In the figure, the broken lines show the image at a first time point t1 right after the start of simulation, that is, an image displayed in the past, while the solid lines show the image at a second time point t2 (>t1) after the elapse of a predetermined time from the start of simulation (for example, at the time of the end of simulation), that is, the image currently being displayed. Therefore, at the present time, the image of the broken lines is not displayed. In FIG. 5, although the movement direction of the robot 100 is shown by the arrow mark, this arrow mark is not displayed on the display unit 3.

As shown in FIG. 5, on the display unit 3, a robot system image 20 corresponding to the robot shape is displayed and indicator images 30 which show the positions of a movement point P is displayed. In FIG. 5, although the indicator images 30 are shown by circle marks, the shapes of the indicators are not limited to this. Furthermore, in FIG. 5, a movement path image 40 which shows a movement path of the movement point P is displayed. Due to this, a user can easily obtain a grasp of the movement path of the movement point P1 and can obtain useful simulation information.

Figure 6A:
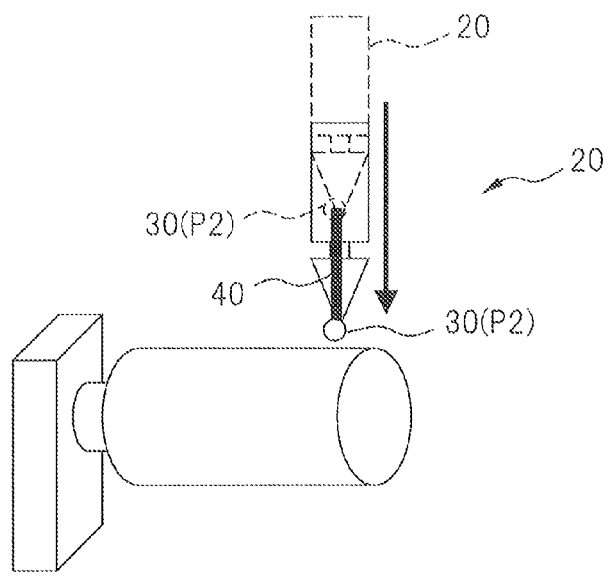
FIG. 6A is a view which shows another example of a display image which is displayed on a display unit of FIG. 2.
Figure 6B:
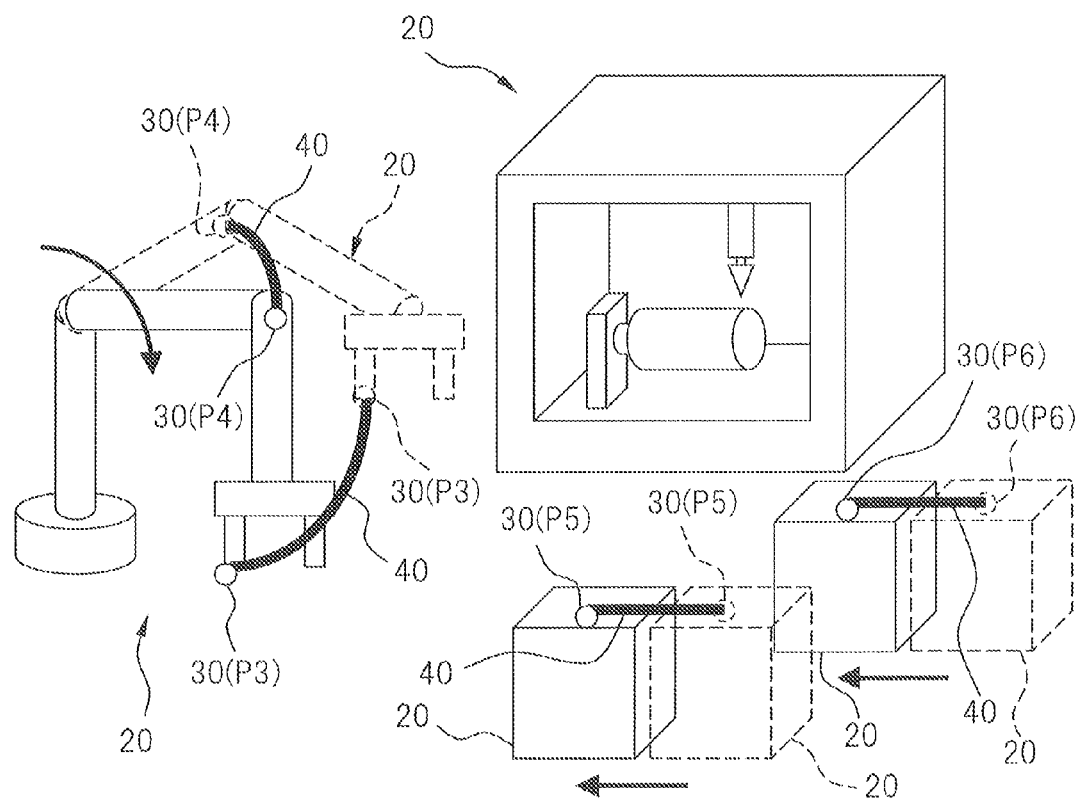
FIG. 6B is a view which shows another example of a display image which is displayed on a display unit of FIG. 2.

FIG. 6A and FIG. 6B are views which show other examples of a display image which displayed on the display unit 3. In FIG. 6A, a machine tool 200 as the robot system image 20 is shown, while in FIG. 6B, the robot 100, machine tool 200, and peripheral devices 300 are shown. In FIG. 6A and FIG. 6B as well, the broken lines show the robot system image 20 and indicator images 30 at the first time point t1, while the solid lines show the robot system image 20 and indicator images 30 at the second time point t2. Therefore, at the present time, the broken line images 20, 30 are not displayed. In FIG. 6A, the movement point P2 (see FIG. 3A) is set at the front end of the tool 202, and the movement path image 40 of the movement point P2 is displayed at the display unit 3. On the other hand, at FIG. 6B, the movement points P3 to P6 (see FIG. 3B) are respectively set at the front end of the hand 102 of the robot 100, the rotary shaft of the arm 101, and the centers of the top surfaces of the peripheral devices 300. The movement paths 40 of these movement points P3 to P6 are displayed on the display unit 3.

In this way, in the first embodiment, the movement points P1 to P6 are set by the control unit 10 linked with specific moving members 5 (arm 101, hand 102, tool 202, and peripheral devices 300), and the time series position data of the movement points P1 to P6 when operating the robot system in accordance with the operation program on a computer (control unit 10) is acquired by the data acquisition unit 12. Furthermore, in the image generation unit 11, the image 20 of the robot system operating in accordance with the operation program on a computer is generated, and images 40 of the movement paths of the movement points P1 to P6 is generated based on the time series position data acquired by the data acquisition unit 12. These robot system image 20 and movement path images 40 are displayed on the display unit 3. Due to this, it is possible for a user to easily obtain a grasp of the movement paths of the movement points P1 to P6 which the user has set through the display on the display unit 3. Therefore, the user can consider the results of the simulation and review the operation program etc. so as to optimize the control of the robot system.

Further, the movement points P1 to P6 can be set at any positions linked with specific moving members 5, so it is possible to respond to a wide range of demands of users. The display unit 3 displays indicator images 30 which show the positions of the movement points P1 to P6, so the user can easily obtain a grasp of the positions of the movement points P1 to P6 corresponding to the movement path images 40.

Figure 7:
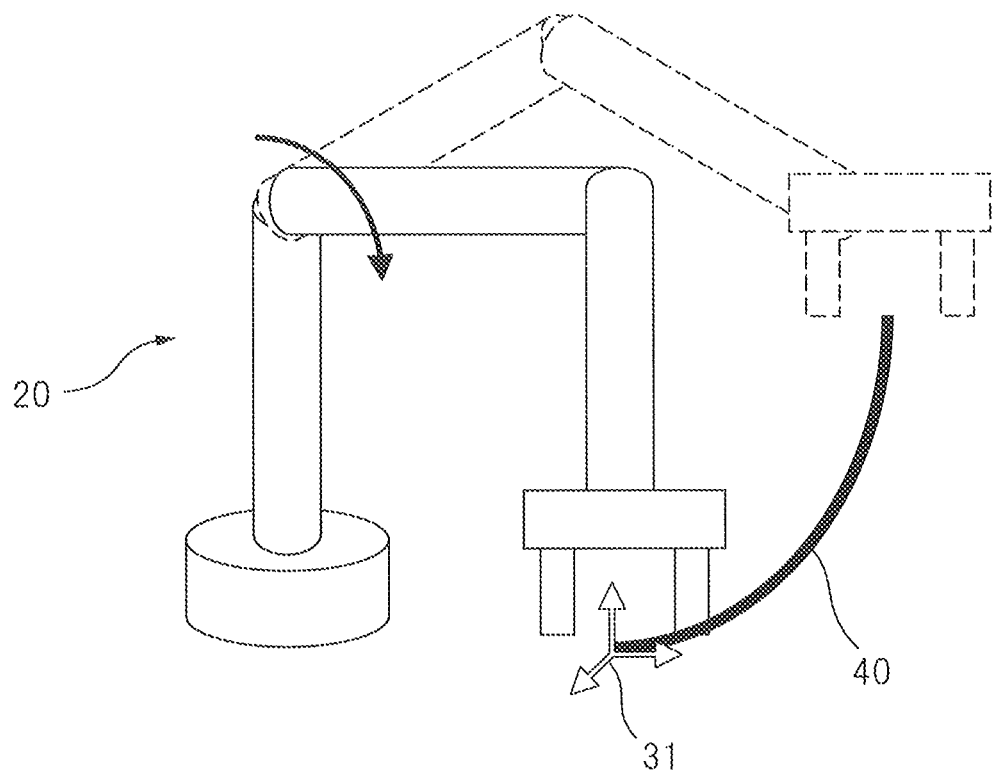
FIG. 7 is a view which shows a modification of FIG. 5.
Figure 8A:
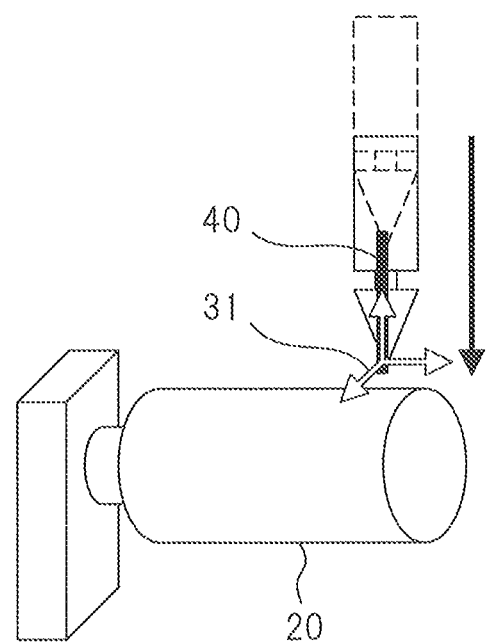
FIG. 8A is a view which shows a modification of FIG. 6A.
Figure 8B:
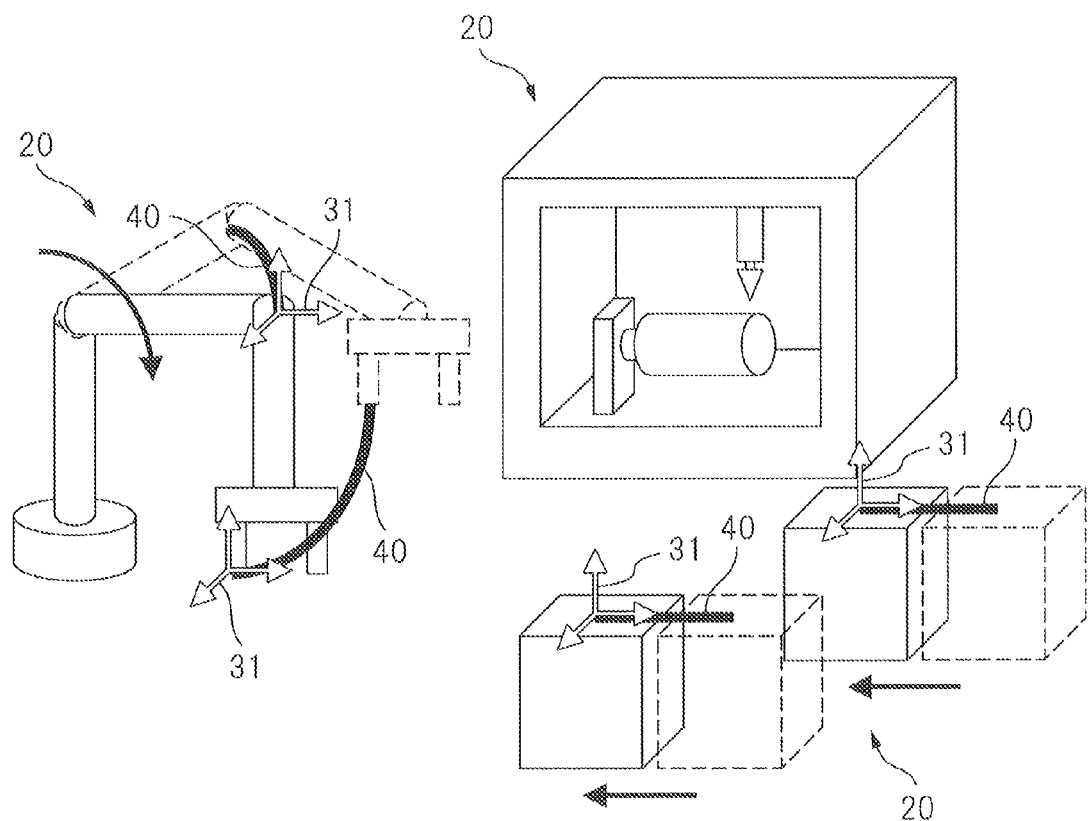
FIG. 8B is a view which shows a modification of FIG. 6B.

FIG. 7 shows a modification of FIG. 5, while FIG. 8A and FIG. 8B respectively show modifications of FIG. 6A and FIG. 6B. In FIG. 7, FIG. 8A, and FIG. 8B, illustration of the indicator images (broken lines) at the first time point t1 is omitted. In FIG. 7, FIG. 8A, and FIG. 8B, unlike FIG. 5, FIG. 6A, and FIG. 6B, the indicator images 31 are formed in shapes simulating a 3D coordinate system of a Cartesian coordinate system of an X-axis, Y-axis, and Z-axis. The image generation unit 11 specifies the postures of the specific moving members 5 (hand 102, tool 202, etc.) and determines the orientations of the indicator images 31 in accordance with the postures of the specific moving members 5 when generating a robot system image 20 based on the operation program and the shape data etc. Due to this, the orientations of the indicator images 31 change in accordance with the postures of the specific moving members 5, so the user can easily obtain a grasp of not only the movement paths of the movement points P, but also the postures of the specific moving members 5 currently being displayed.

Second Embodiment

Figure 9A:
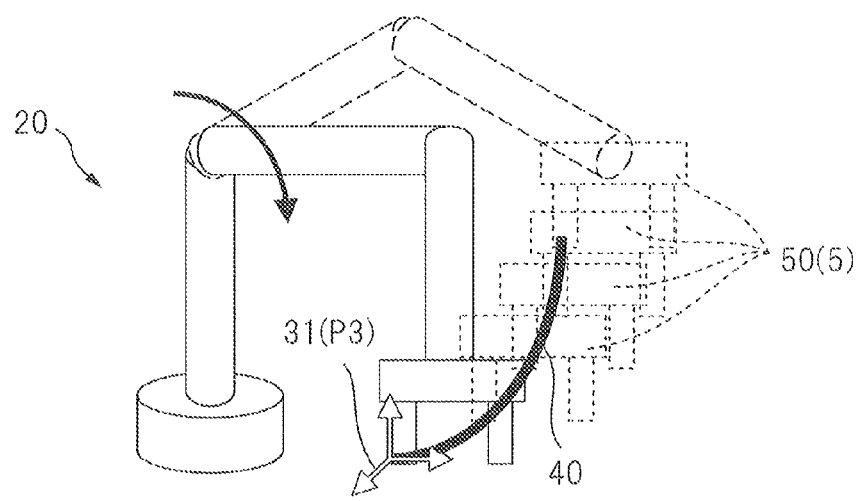
FIG. 9A is a view which shows an example of a display image which is displayed on a display unit of an operation simulation system according to a second embodiment of the present invention.
Figure 9B:
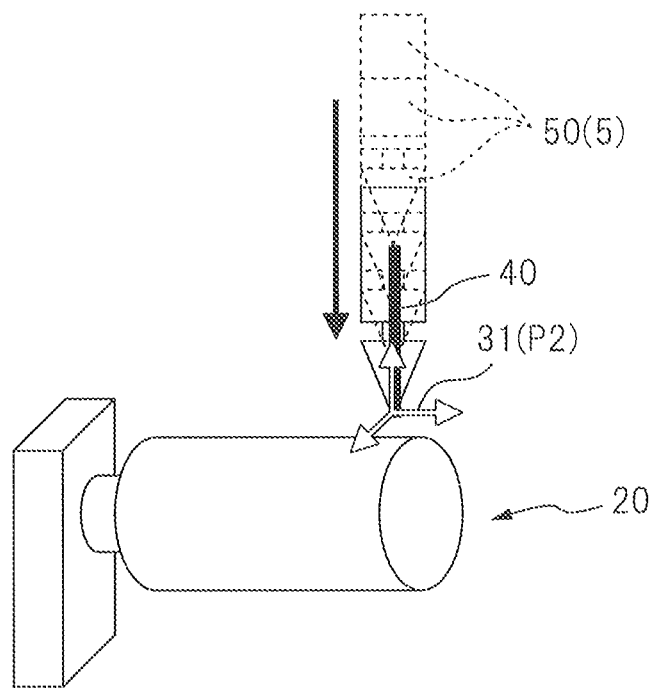
FIG. 9B is a view which shows another example of a display image which is displayed on a display unit of an operation simulation system according to the second embodiment of the present invention.

Referring to FIG. 9A and FIG. 9B, a second embodiment of the present invention will be explained. Below, the points of difference from the first embodiment will mainly be explained. The second embodiment differs from the first embodiment in the processing in the image generation unit 11. That is, in the first embodiment, by the processing at the image generation unit 11, the robot system image 20, indicator images 30, 31, and movement path images 40 are generated and these images are displayed on the display unit 3. As opposed to this, in the second embodiment, the image of a specific moving member 5 which defines a movement point P (moving member image) is further generated and this is displayed on the display unit 3.

FIG. 9A and FIG. 9B are views which show examples of the display image displayed on the display unit 3. In FIG. 9A, a movement point P3 is set at the front end position of the grippers of the hand 102, while in FIG. 9B, a movement point P2 is set at the front end position of the tool 202. The image generation unit 11 generates as the moving member image 50 an image of a specific moving member 5 which corresponds to a movement point P at a time point which is different from the second time point t2 being displayed on the display unit 3 (time point before second time point t2) among the time series movement points P acquired by the data acquisition unit 12. In the example shown at FIG. 9A, a plurality of images of hands 102 which correspond to the movement point P3 at predetermined time intervals are generated as the moving member images 50 and are displayed on the display unit 3. In the example shown in FIG. 9B, a plurality of images of tools 202 which correspond to the movement point P2 at predetermined time intervals are generated as the moving member images 50 and are displayed on the display unit 3. In FIG. 9A and FIG. 9B, in order to differentiate from the image of the specific moving member 5 at the second time point included in the robot system image 20 (solid lines), the moving member images 50 are shown by broken lines. However, it is also possible to display the moving member images 50 by another display form (for example, different color).

In this way, in the second embodiment, a plurality of moving member images 50 which shows a specific moving member 5 corresponding to a movement point P at different time points which moves according to an operation program is displayed, so the movement path of not only the movement point P but the specific moving member 5 as a whole can be easily grasped by the user. By displaying the moving member images 50, the change in posture of the moving member can also be easily recognized by the user.

Third Embodiment

Referring to FIG. 10 to FIG. 13, a third embodiment of the present invention will be explained. Below, the points of difference from the second embodiment will mainly be explained. Although in the second embodiment, a plurality of moving member images 50 corresponding to a movement point P obtained at predetermined time intervals are displayed, the third embodiment is configured to display only the moving member images 50 which satisfy predetermined conditions. That is, in the third embodiment, on the assumption that an obstacle is located around specific moving member 5 corresponding to a movement point P, only a moving member image 50 which interferes with the obstacle is displayed on the display unit 3. The position data which shows the shape and position (contours) of the obstacle is stored in the memory of the operation simulation system 1 (for example, the memory of the control unit 10) in advance. This memory functions as an obstacle memory which stores the position data of the obstacle.

Figure 10:
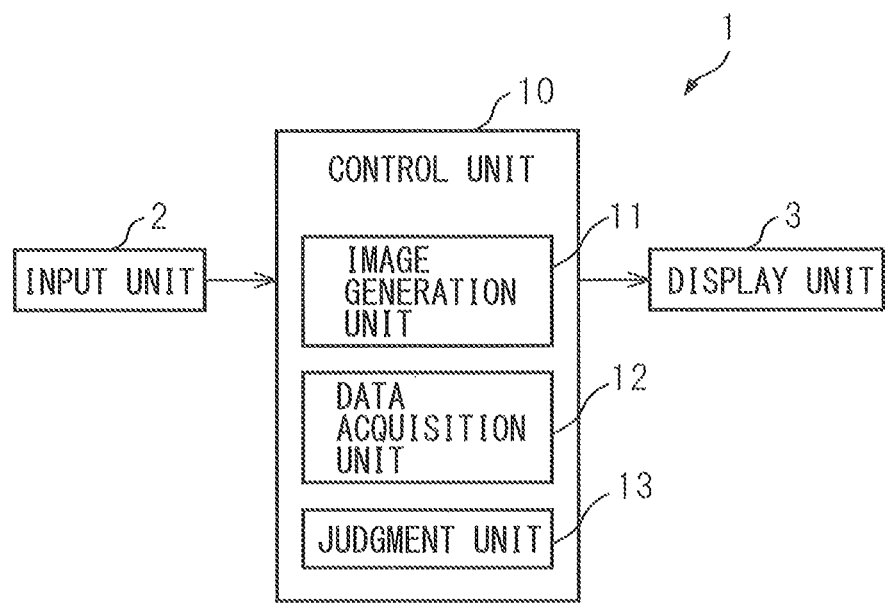
FIG. 10 is a block diagram which shows the general configuration of an operation simulation system according to a third embodiment of the present invention.
Figure 11A:
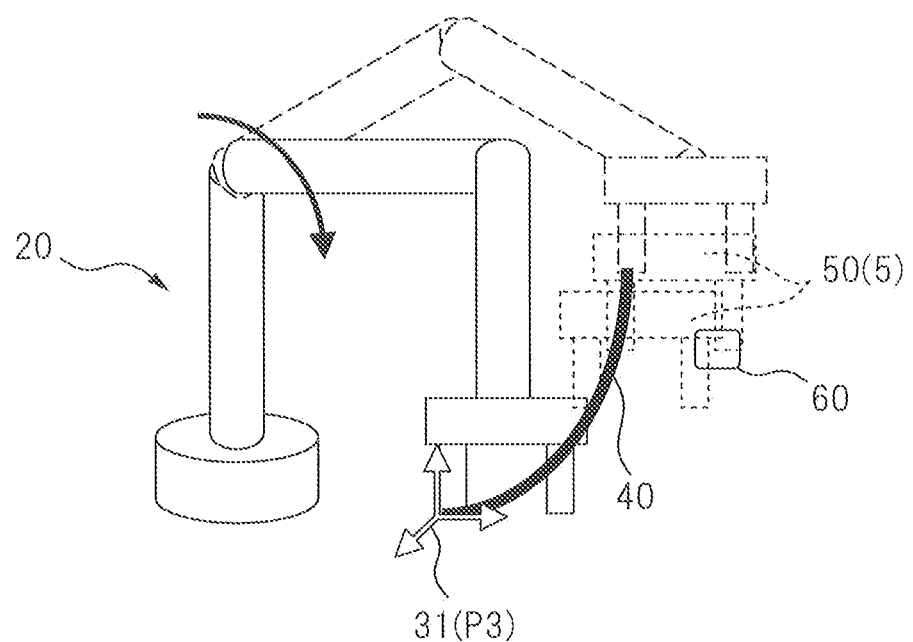
FIG. 11A is a view which shows an example of a display image which is displayed on a display unit of FIG. 10.
Figure 11B:
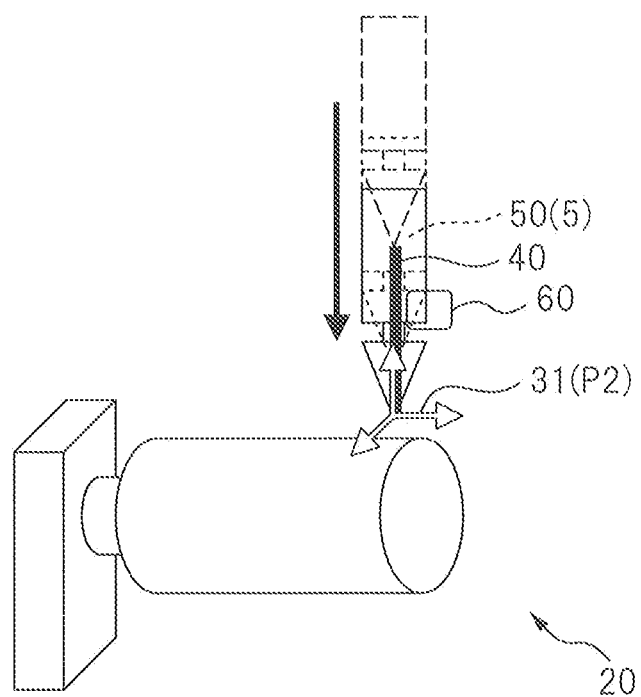
FIG. 11B is a view which shows another example of a display image which is displayed on a display unit of FIG. 10.

FIG. 10 is a block diagram which shows the general configuration of an operation simulation system 1 according to the third embodiment. The same locations as FIG. 2 are assigned the same reference notations. As shown in FIG. 10, the control unit 10 has a judgment unit 13 which judges whether an obstacle and a specific moving member 5 interfere with each other. The judgment unit 13, for example, compares the position data which shows the contours of the specific moving member 5 and the position data which shows the contours of the obstacle each time the specific moving member 5 moves in accordance with the operation program and, when the two position data overlap, judges that there is interference. The image generation unit 11 generates not only the robot system image 20, indicator images 30, 31, and movement path image 40, but also an obstacle image 60 which shows the shape of the obstacle (FIG. 11A and FIG. 11B). Furthermore, if the judgment unit 13 judges that a specific moving member 5 and the obstacle will interfere at a certain time point, it generates a moving member image 50 corresponding to the specific moving member 5 at that time point. The images which are generated at the image generation unit 11 are displayed on the display unit 3.

FIG. 11A and FIG. 11B are views which show examples of the display image displayed on the display unit 3. In FIG. 11A, the movement point P3 is set at the front end position of the grippers of the hand 102, while in FIG. 11B, the movement point P2 is set at the front end position of the tool 202. As shown in FIG. 11A and FIG. 11B, differing from FIG. 9A and FIG. 9B, the display unit 3 displays only a moving member image 50 at the time point when the obstacle and a specific moving member 5 interfere as the moving member image 50. The obstacle image 60 interferes with this moving member image 50.

In this way, in the third embodiment, the existence of interference between a specific moving member 5 and the obstacle at the time of movement of the specific moving member 5 in accordance with the operation program is judged by the judgment unit 14, when it is judged that there is interference, a moving member image 50 corresponding to the movement point P at the point time of that interference is generated and displayed on the display unit 3. Due to this, the user can easily obtain a grasp of the presence of interference of the specific moving member 5 and obstacle, and the state of the interference.

Figure 12A:
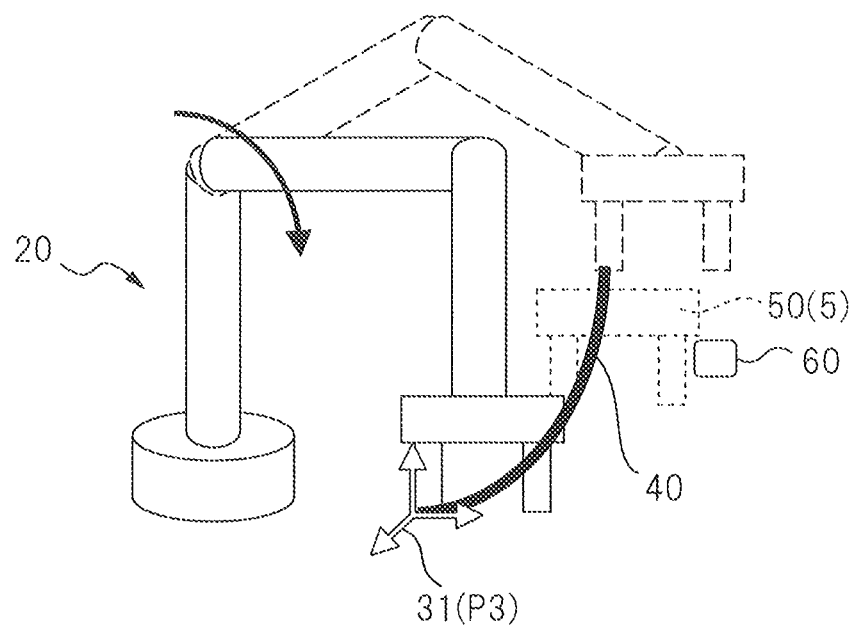
FIG. 12A is a view which shows a modification of FIG. 11A.
Figure 12B:
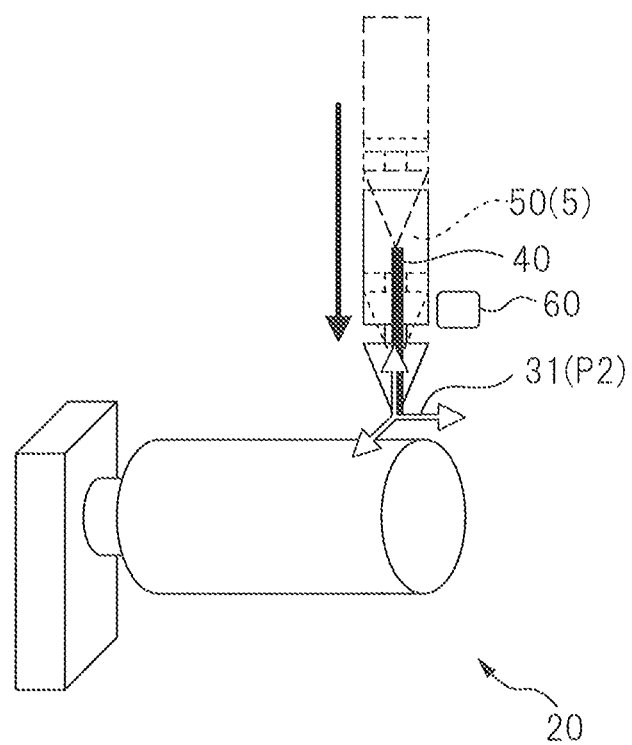
FIG. 12B is a view which shows a modification of FIG. 11B.

If a specific moving member 5 and the obstacle do not interfere, it is also possible that the judgment unit 13 judges the time point when the distance between the specific moving member 5 and the obstacle becomes the smallest when operating the robot system in accordance with an operation program, and possible that the image generation unit 11 generate a moving member image 50 corresponding to the movement point P at the judged time point. FIG. 12A and FIG. 12B are views which show examples of the display image displayed on the display unit 3 in that case. In FIG. 12A and FIG. 12B, a moving member image 50 which is the closest to the obstacle is displayed together with the obstacle image 60. By displaying the moving member image 50 at which the distance from the obstacle becomes the smallest in this way, a user can easily obtain a grasp of which degree of margin there is between the specific moving member 5 and the obstacle.

Figure 13:
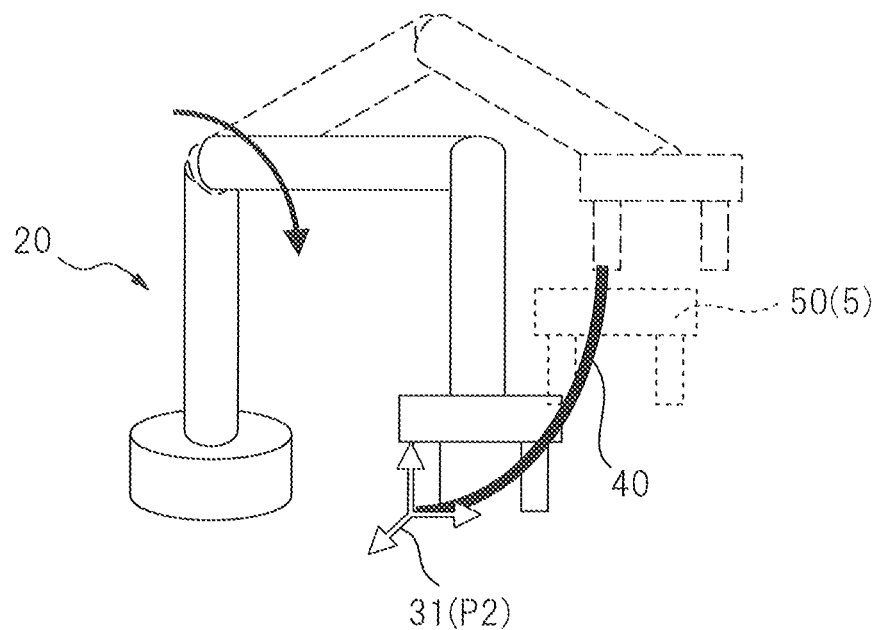
FIG. 13 is a view which shows another modification of FIG. 11A.

In the judgment unit 13, instead of judging the positional relationship with the obstacle, it is also possible to judge the time point when a specific moving member 5 displaces to the maximum in a predetermined axial direction of the three-axis Cartesian coordinate system or the individual axial directions, that is, the time point when the operating range is the limit, and in the image generation unit 11, to generate a moving member image 50 corresponding to the movement point P at that time point. FIG. 13 is a view which shows an example of a display image displayed on the display unit 3 in this case, while the moving member image 50 in the figure corresponds to the moving member which is positioned at a limit position or unique point of the operating range. It is also possible to judge the time point when a specific moving member 5 is positioned near the limit position of the operation range or near a unique point and display a moving member image 50 corresponding to that time point.

Fourth Embodiment

Figure 14:
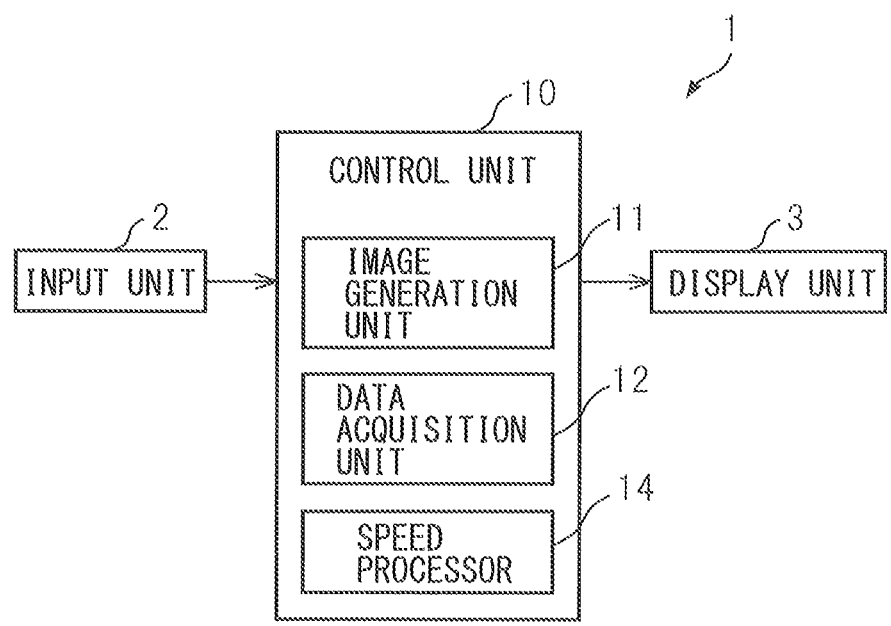
FIG. 14 is a block diagram which shows the general configuration of an operation simulation system according to a fourth embodiment of the present invention.
Figure 15A:
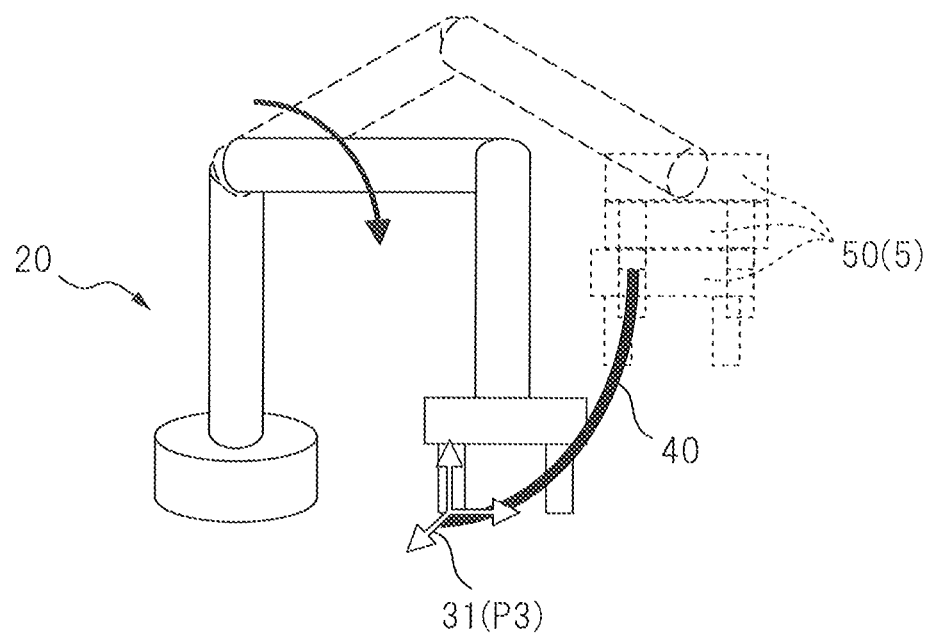
FIG. 15A is a view which shows an example of a display image which is displayed on a display unit of FIG. 14.
Figure 15B:
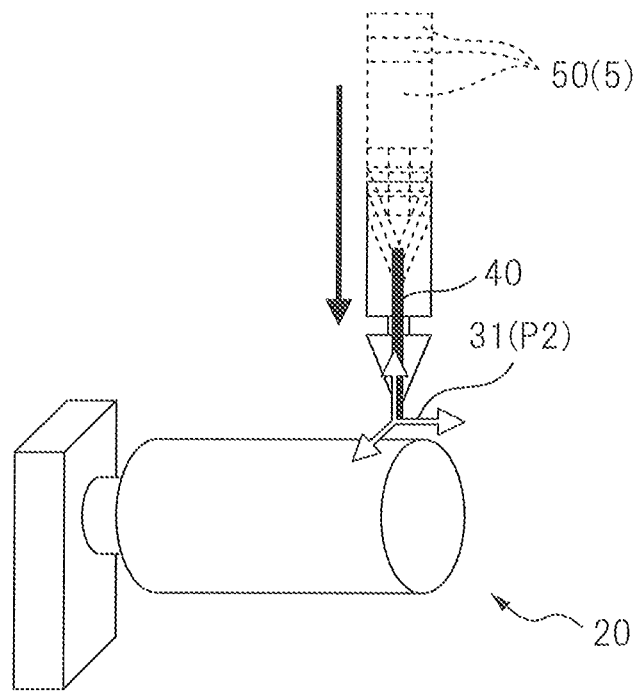
FIG. 15B is a view which shows another example of a display image which is displayed on the display unit of FIG. 14.

Referring to FIG. 14 to FIG. 15B, a fourth embodiment of the present invention will be explained. Below, the points of difference from the third embodiment will mainly be explained. In the third embodiment, whether there is an interference between a specific moving member 5 and an obstacle is judged to determine which time point of the moving member image 50 should be displayed. As opposed to this, in the fourth embodiment, the speed of a specific moving member 5 is computed and, in accordance with the result of computation, it is determined which point of time of the moving member image 50 should be displayed.

FIG. 14 is a block diagram which shows the general configuration of an operation simulation system 1 according to the fourth embodiment. The same Portions as FIG. 3 are assigned the same reference notations. As shown in FIG. 14, the control unit 10 has a speed processor 4 which computes the speed of a specific moving member 5. The speed processor 14, for example, computes the amount of movement per unit time of a specific moving member 5 which moves in accordance with an operation program each time the data acquisition unit 12 acquires a movement point P, and calculates the speed of the specific moving member 5 at each time point. The image generation unit 11 generates a moving member image 50 corresponding to the movement point P at the time point when the speed calculated by the speed processor 4 becomes equal to or more than a predetermined speed or equal to or less a predetermined speed and displays it on the display unit 3.

FIG. 15A and FIG. 15B are views which show examples of a display image displayed on the display unit 3 by an operation simulation system 1 according to the fourth embodiment. In FIG. 15A, a plurality of moving member images 50 at time points when a hand 102 as a specific moving member 5 moves at a predetermined speed or more or a predetermined speed or less are displayed. In FIG. 15B, a plurality of the moving member images 50 at time points when a tool 202 as a specific moving member 5 moves at a predetermined speed or more or a predetermined speed or less are displayed. By displaying the moving member images 50 at time points when moving by a predetermined speed or more or a predetermined speed or less in this way, the user can easily obtain a grasp of the state of movement of a specific moving member 5 at the maximum speed or the minimum speed.

Fifth Embodiment

Figure 16:
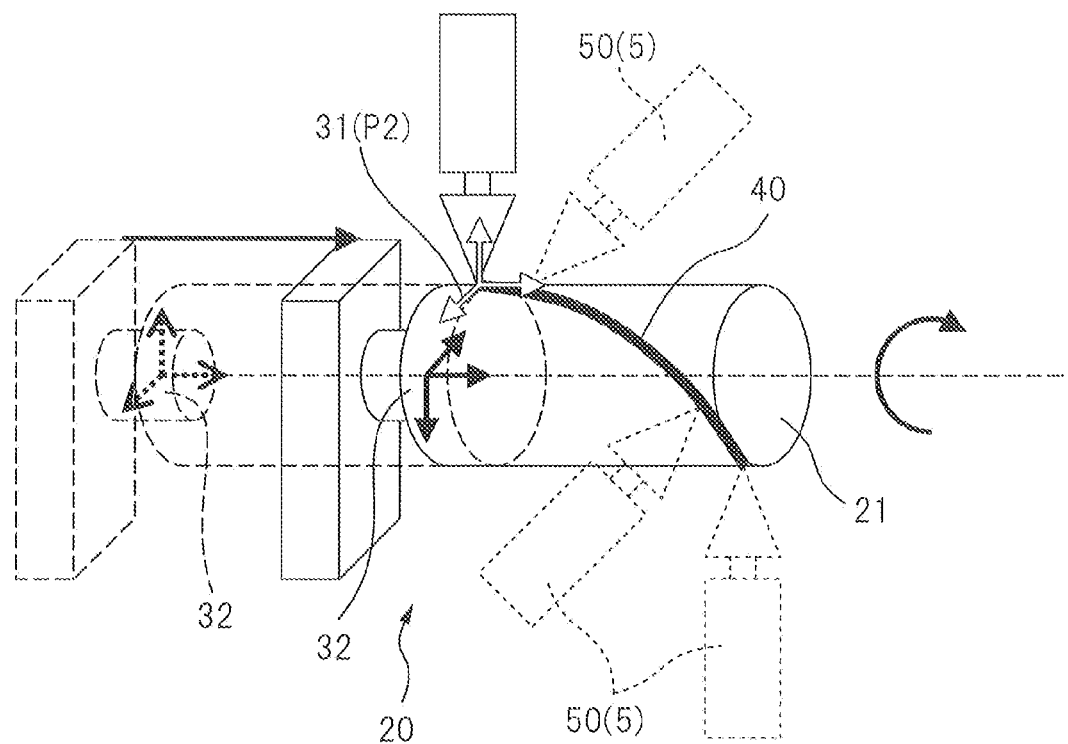
FIG. 16 is a view which shows an example of a display image which is displayed on a display unit of an operation simulation system according to a fifth embodiment of the present invention.

Referring to FIG. 16, a fifth embodiment of the present invention will be explained. Below, the points of difference from the second embodiment will mainly be explained. In the fifth embodiment, a tool 202 of a machine tool 200 is used as the specific moving member 5 and the moving member image 50 is made to move relatively along the workpiece image so as to generate a movement path image 40.

FIG. 16 is a view which shows an example of the display image displayed on the display unit 3 of the operation simulation system 5 according to the fifth embodiment. In the figure, the broken lines (except the moving member image 50) show the image at a first time point t1 right after the start of simulation, while the solid lines show the image at a second time point t2 after the elapse of a predetermined time from the start of simulation. A movement point P2 is set at the front end position of a tool 202, so the specific moving member 5 is the tool 202. The workpiece W moves translationally while rotating from the first time point to the second time point as shown by the arrow marks. In accordance with this movement, a workpiece origin 32 which shows the workpiece coordinate system at a reference point of the workpiece W moves (translationally and rotationally).

At this time, the image generation unit 11 generates a robot system image 20 including the workpiece image 21, moves the specific moving member 5 relatively along the workpiece surface in accordance with movement of the workpiece origin 32, and generates moving member images 50 based on the workpiece image 21. Due to this, as shown in FIG. 16, a plurality of moving member images 50 are displayed around the workpiece image 21, while a movement path image 40 is displayed at the surface of the workpiece image 21.

In this way, in the fifth embodiment, moving member images 50 are generated with reference to the workpiece image 21 so that the moving member images 50 which show the tool 202 move relatively along the workpiece image 21, and are displayed on the display unit 3. Due to this, even when fastening the tool 202 in position to work the workpiece W, it is possible to display an image of the path of the tool along the workpiece image 21 (movement path image 40). In FIG. 16, although the moving member images 50 and the movement path image 40 are displayed, the display of the moving member images 50 may also be omitted. The tool 202 used as the working member may be any tool.

Sixth Embodiment

Referring to FIG. 17 to FIG. 19B, a sixth embodiment of the present invention will be explained. Below, the points of difference from the second embodiment will be mainly explained. In the sixth embodiment, the welding torch is used as the specific moving member 5, and the display unit 3 displays a bead image which shows a weld bead.

Figure 17:
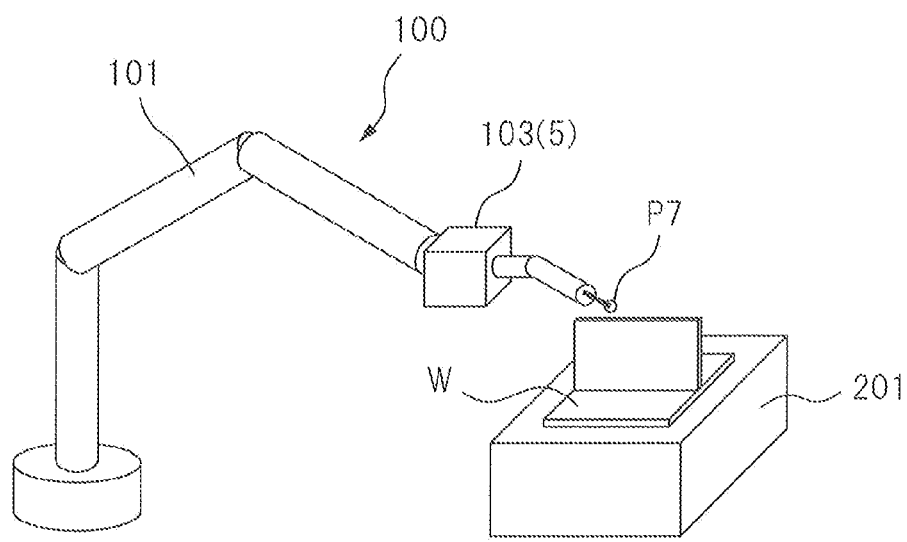
FIG. 17 is a view which shows the general configuration of a robot system to which the operation simulation system according to the sixth embodiment of the present invention is applied.

FIG. 17 is a view which shows the general configuration of a robot system according to the sixth embodiment. As shown in FIG. 17, in the robot system of the sixth embodiment, a welding torch 103 is attached to the front end of the arm 101 of the robot 100. The welding torch 103 is used to weld a workpiece W mounted on a workpiece support 201. The welding torch 103 is the specific moving member 5. A movement point P7 is set on the front end of the welding torch 103.

Figure 18:
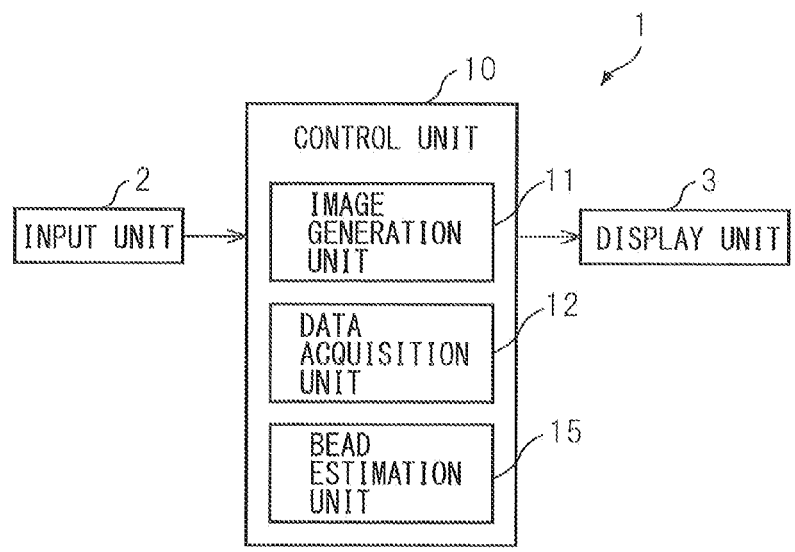
FIG. 18 is a block diagram which shows the general configuration of an operation simulation system according to a sixth embodiment of the present invention.

FIG. 18 is a block diagram which shows the general configuration of the operation simulation system 1 according to the sixth embodiment. The same portions as FIG. 3 are assigned the same reference notations. As shown in FIG. 18, the control unit 10 has a bead estimation unit 15 which estimates the position of formation of the weld bead. The weld bead is generated when operating the robot system in accordance with an operation program and using the welding torch 103 to weld the workpiece W. The genesis position of the weld bead can be estimated in accordance with the operation program or the shape data etc. of the workpiece W.

Figure 19A:
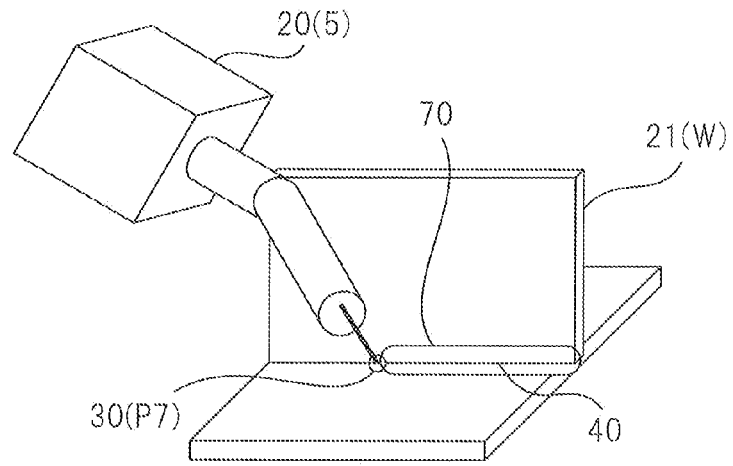
FIG. 19A is a view which shows another example of a display image which is displayed on a display unit of FIG. 18.

FIG. 19A is a view which shows an example of the display image displayed on the display unit 3. The image generation unit 11 generates a robot system image 20 which includes a workpiece image 21 and generates an indicator image 30 and a movement path image 40. Furthermore, the image generation unit 11 generates a bead image 70 which shows the weld bead at a position estimated by the bead estimation unit 15. The robot system image 20, indicator image 30, movement path image 40, and bead image 70 generated by the image generation unit 11 are displayed on the display unit 3 as shown in FIG. 19A.

In this way, in the sixth embodiment, the genesis position of the weld bead is estimated and the bead images 70 is displayed, so the weld bead formed by the welding torch 103 can be easily grasped by the user.

The bead estimation unit 15 may not only estimate the genesis position of the weld bead, but also the shape of the weld bead (width and thickness of weld bead). In this case, the bead estimation unit 15 can determine the weld bead shape in accordance with the welding conditions including at least one of for example the welding speed, the posture of the welding torch 103, the direction of advance of the welding torch 103, the posture of the workpiece W, the direction of gravity, and the welding current. The image generation unit 11 estimates a bead image 70 in accordance with the shape of the weld bead estimated by the bead estimation unit 15 and displays it on the display unit 3.

Figure 19B:
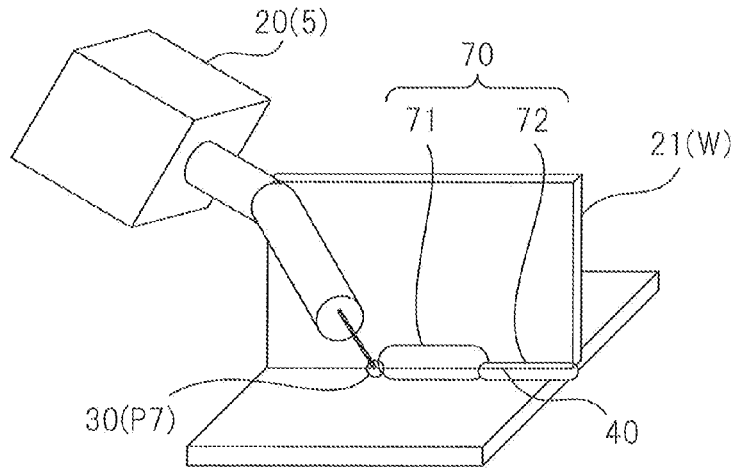
FIG. 19B is a view which shows another example of a display image which is displayed on a display unit of FIG. 18.

FIG. 19B is a view which shows an example of a display image displayed on the display unit 3 in this case. As shown in FIG. 19B, bead images 71, 72 which show weld beads of different shapes from each other generated by welding conditions which differ from each other are displayed on the display unit 3. Due to this, a user can obtain a grasp of the shape of the weld bead easily and in detail.

In the above embodiments, although a movement point is set at the control unit 10 linked with a specific moving member 5 by operation of the input unit 2, the setting unit may be configured in any way. The configuration of the moving member corresponding to the movement point P, that is, the specific moving member 5, is not limited to the one explained above. In the above embodiments (for example, FIG. 5), although the robot system image 20, indicator images 30, and movement path images 40 are displayed, it is also possible to omit the display of the indicator images 30. That is, so long as displaying at least the robot system image 20 and the movement path image 40, any mode of display of the results of simulation may be used.

In the above embodiments, although the robot 100, the machine tool 200, and the peripheral devices 300 are used to configure the robot system, the robot 100 alone may also be used to configure the robot system. Although the robot system is configured for use for working a workpiece, the robot system may also be used for other applications, and the configuration of the robot system is not limited to the above. In the above embodiments, although the operation simulation system 1 is provided separate from the control device 400 (FIG. 1), the operation simulation system 1 may also be assembled in the control device 400.

It is possible to freely combine the above embodiments and one or more of the modifications.

According to the present invention, an image of a movement path of a movement point which is set linked with the moving member is generated, and displayed on a display unit, so it is possible for a user to easily grasp how a specific portion operates.

While the present invention has been described with reference to the preferred embodiments thereof, it will be understood, by those skilled in the art, that various changes and modifications may be made thereto without departing from the scope of the appended claims.

The invention claimed is:

1. An operation simulation system for simulating, on a computer, operation of a robot system having a robot, a machine tool and a peripheral device, the robot system including moving members configured to move in accordance with a predetermined operating program, the operation simulation system comprising:
    a memory storing in advance the operating program, shape data of the moving members, and shape data of a workpiece;
    a setting unit configured to set movement points, which are configured to move together with the moving members, at specific portions of the robot and the machine tool or at specific portions of the robot and the peripheral device which are linked with the moving members,
        wherein the movement points are set based on different positional coordinates of the corresponding moving members;
    a data acquisition unit configured to acquire time series position data of the movement points when simulating operation of the robot system in accordance with the operating program on the computer;
    an image generation unit configured to generate
        an image of the robot system operating in accordance with the operating program based on (i) the simulated operation of the robot system on the computer and (ii) the shape data of the moving members and the shape data of the workpiece stored in the memory, and
        an image of movement paths of the corresponding movement points based on the time series position data acquired by the data acquisition unit; and
    a display unit configured to display the image of the robot system and the image of the movement paths generated by the image generation unit.

2. The operation simulation system of the robot system according to claim 1,
    wherein the image generation unit is further configured to generate an indicator image which is an image of an indicator representing
        a position of a corresponding movement point among the movement points, or
        a position of the corresponding movement point and a posture of the corresponding moving member, and
    wherein the display unit is further configured to display the indicator image generated by the image generation unit.

3. The operation simulation system of the robot system according to claim 2,
    wherein the indicator image is an image which simulates a 3D coordinate system representing the posture of the corresponding moving member.

4. The operation simulation system of the robot system according to claim 1,
    wherein the image generation unit is further configured to generate a moving member image which is an image of the moving member corresponding to a movement point among the movement points at different time points, and
    the display unit is further configured to display the moving member image generated by the image generation unit.

5. The operation simulation system of the robot system according to claim 4, further comprising:
    an obstacle memory in which position data of an obstacle located around a moving member among the moving members is stored; and
    a judgment unit configured to judge whether the moving member and the obstacle interfere with each other, when simulating the operation of the robot system in accordance with the operating program on the computer, based on the position data stored in the obstacle memory,
    wherein the image generation unit is configured to generate, if it is judged by the judgment unit that the moving member and the obstacle interfere, the moving member image of the moving member at a time point when the moving member and the obstacle interfere.

6. The operation simulation system of the robot system according to claim 4, further comprising:
    an obstacle memory in which position data of an obstacle located around a moving member among the moving members is stored; and
    a judgment unit configured to judge a time point when a distance between the moving member and the obstacle becomes a minimum, when simulating the operation of the robot system in accordance with the operating program on the computer, based on the position data stored in the obstacle memory,
    wherein the image generation unit is configured to generate the moving member image of the moving member at the time point judged by the judgment unit.

7. The operation simulation system of the robot system according to claim 4, further comprising:
    a judgment unit configured to judge (i) a time point when a moving member among the moving members is displaced to a maximum, or (ii) a time point when the moving member is positioned at a unique point, when simulating the operation of the robot system in accordance with the operating program on the computer,
    wherein the image generation unit is configured to generate the moving member image of the moving member at the time point judged by the judgment unit.

8. The operation simulation system of the robot system according to claim 4, further comprising:
a speed processor configured to compute a speed of a moving member among the moving members, when simulating the operation of the robot system in accordance with the operating program on the computer,
wherein the image generation unit is configured to generate the moving member image of the moving member at a time point when the speed computed by the speed processor becomes equal to or more than a predetermined speed, or becomes equal to or less than a predetermined speed.

9. The operation simulation system of the robot system according to claim 4,
wherein the moving member includes a working member for working the workpiece,
wherein the moving member image is an image representing the working member,
wherein the image of the robot system includes a workpiece image representing the workpiece, and
wherein the image generation unit is configured to generate the moving member image with reference to the workpiece image, so that the moving member image moves relatively along the workpiece image.

10. The operation simulation system of the robot system according to claim 1,
wherein a moving member among the moving members includes a welding torch for welding the workpiece,
wherein the image of the robot system includes a workpiece image representing the workpiece,
wherein the operation simulation system further comprises a bead estimation unit configured to estimate a genesis position of a weld bead, when simulating the operation of the robot system in accordance with the operating program on the computer, to weld the workpiece by the welding torch,
wherein the image generation unit is further configured to generate a bead image representing the weld bead at the genesis position estimated by the bead estimation unit, and
wherein the display unit is further configured to display the bead image generated by the image generation unit.

11. The operation simulation system of the robot system according to claim 10,
wherein the bead estimation unit is configured to determine a shape of the weld bead in accordance with a welding condition including at least one of a welding speed, a posture of the welding torch, a direction of advance of the welding torch, a posture of the workpiece, a direction of gravity, and a welding current, and
wherein the image generation unit is configured to generate the bead image in accordance with the shape of the weld bead determined by the bead estimation unit.

12. The operation simulation system of the robot system according to claim 1,
wherein the moving members comprise two or more selected from the group consisting of a hand of the robot, an arm of the robot, a tool of the machine tool for processing a workpiece, and the peripheral device.

13. The operation simulation system of the robot system according to claim 1, wherein
the setting unit is configured to set the movement points, in accordance with user input, to any positions linked with the moving members.

14. The operation simulation system of the robot system according to claim 1, wherein
the setting unit is configured to set the movement points, in accordance with user input, as arbitrary movement points at the specific portions which are linked with the moving members.

* * * * *